J. CHASKEL,

Assignor to THE NEW YORK RUBBER CO.

Whistling Toy.

No. 9,255. Reissued June 15, 1880.

Witnesses
Philip Mauro
C. J. Hedrick

Inventor
James Chaskel
by A. Pollok his atty.

N. PETERS PHOTO-LITHOGRAPHER, WASHINGTON, D. C.

UNITED STATES PATENT OFFICE.

JAMES CHASKEL, OF NEW YORK, N. Y., ASSIGNOR TO THE NEW YORK RUBBER COMPANY.

WHISTLING-TOY.

SPECIFICATION forming part of Reissued Letters Patent No. 9,255, dated June 15, 1880.

Original No. 153,155, dated July 21, 1874. Application for reissue filed May 8, 1880.

*To all whom it may concern:*

Be it known that I, JAMES CHASKEL, of the city, county, and State of New York, have invented a certain new and useful Improvement in Whistling-Toys, of which the following is a specification.

Heretofore whistling-toys have been made of rubber with a whistle inserted in the body of a ball or other hollow figure, so that by compressing the figure whistling sounds are produced. The ability to cause a sound to proceed from the toy by striking it against an object or moving it forward or backward or to and fro in the air possesses for children a great charm.

The whistling-toys heretofore made are not adapted for such purpose; besides, the ordinary whistle is liable to be pulled out or become detached from the rubber figure and lost, and the whistling attraction of the toy is thereby destroyed. It is moreover liable, from its small size, to be swallowed by the child.

By this invention a toy is constructed which can be readily grasped by the child, and will emit a whistling sound when moved to and fro or struck against any object that the child may fancy, and in which the objections before indicated are avoided.

The hollow compressible ball or figure, with the interior of which the whistle is in communication, is secured upon a suitable handle. The whistle is attached to or made a part of the handle in such a way that it cannot be readily detached and lost.

In order to enhance the attractions of the toy, a second whistle may be formed at the end of the handle opposite to that with which the hollow figure is connected.

In order that the invention and the manner of carrying the same into effect may be readily understood, reference is made to the accompanying drawings, which form a part of this specification, and in which—

Figure 1:
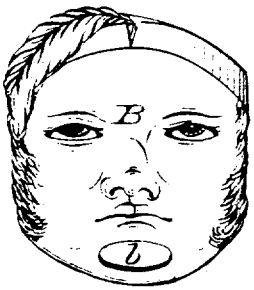
Figure 2:
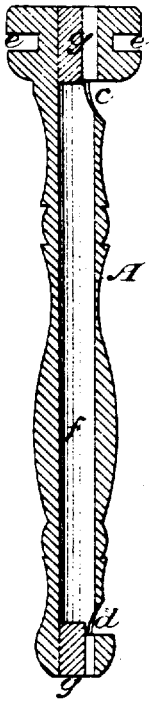

Figure 1 is a perspective view of the hollow ball and figure; Fig. 2, a longitudinal central section of the handle; and Fig. 3 a view, in elevation, of the toy complete.

Figure 3:
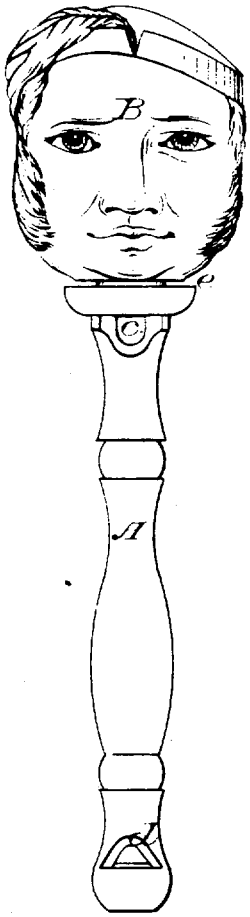

A is the handle of the toy, provided at its upper end with an enlargement in which the circular groove *c* is made. The hollow ball or figure B is made of rubber, so as to be compressible, and is provided with an opening, *b*, through its bottom, so that by stretching it may be drawn over the upper end of the handle of the toy and attached thereto by allowing the rubber to seat itself in the circular groove *e*, as shown in Fig. 3.

The method by which the rubber ball or figure is secured to the handle insures a flexible connection therewith, which permits a swaying motion to be imparted to said ball or figure, so that when moved with sufficient force forward or backward, or both, the interior capacity is lessened and the air is forced through the whistle connected therewith, causing it to sound.

When the ball is struck against an object or squeezed by the hands of the child it will also be compressed and the whistle sounded.

By providing the additional whistle the handle can be used by the child as an ordinary whistle.

The upper end of the handle A, which is of wood or other material, is provided with a whistle communicating with the interior of the ball or figure B.

The whistle is formed by a channel or passage extending to the end of the handle, a plug, *g*, partly filling the bore at the end, and a suitably-shaped opening cut in the side, so as to have a beveled edge toward the upper end, and to connect with the said channel, as shown at *c*, Figs. 2 and 3. The parts are so arranged that when the ball or figure is compressed the air is forced through the narrow space at the side of the plug *g*, and by striking the edge of the opening *c* is thrown into vibration in a manner similar to the common wooden or metal whistles made to be blown by the mouth.

The lower end of the handle may be provided with a whistle, which can be similarly made.

For the purpose of readily making the double whistle the handle may be formed of a single piece of wood or other suitable material having a tubular channel or passage, *f*, extending from end to end, so that to form the whistles it is only necessary to cut the side holes, *c d*, and insert the plugs *g g*.

It will be seen that either whistle *c* or *d* may be used at different times to produce the whistling sounds, or that both may be used simultaneously. In other words, the lower end of the handle may be inserted in the mouth and the whistle *d* blown, while at the same time the whistle *c* may be blown by compressing the figure B.

Having now fully described my said invention and the manner in which the same is or may be carried into effect, what I claim, and desire to secure by Letters Patent, is—

1. A whistling-toy consisting of a hollow compressible ball or figure, a handle connected therewith, substantially in the manner indicated, and a whistle communicating with the interior of the ball or figure.

2. A whistling-toy the handle of which is provided with a whistle at each end, in combination with a hollow compressible ball or figure, substantially as described.

3. The combination, in a whistling-toy with a hollow compressible ball or figure, of a handle for supporting the same, and a whistle attached to or forming part of said handle and communicating with the interior of said ball or figure, substantially as described.

4. In a whistling-toy having a hollow compressible ball or figure attached to a handle, the handle constructed, as described, with a tubular passage extending from end to end and provided with a whistle at each end, formed by cutting an opening with a bevel edge in the side of the handle and partially plugging up the bore of the tubular passage at the end, as set forth.

In testimony whereof I have signed this specification in the presence of two subscribing witnesses.

JAMES CHASKEL.

Attest:
WM. H. ACKEN,
JNO. P. RIDER.